Patented Apr. 5, 1949

2,466,656

UNITED STATES PATENT OFFICE 2,466,656

PROCESS FOR PRINTING WITH SULFURIC ESTERS OF LEUCO VAT DYESTUFFS

William B. Hardy and Elizabeth M. Hardy, Bound Brook, N. J., assignors to American Cyanamid Company, New York, N. Y., a corporation of Maine No Drawing. Application July 31, 1946, Serial No. 687,519

10 Claims. (Cl. 8—70)

This invention relates to an improved process for printing textile fibers and fabrics with difficultly oxidizable sulfuric ester salts of leuco vat dyes using the dichromate-acid vapor developing method Printing of textiles with sulfuric ester salts of leuco vat dyes has been carried out by a number of general procedures. One of the processes incorporates a powerful oxidizing agent in the printing paste, such as a chlorate, and the print is developed by treatment with steam and acid vapors. This process is generally usable with all stable dyestuffs. However, it is open to a very serious disadvantage when the dye mixture printed contains dyes which are sensitive to oxidizing agents. In the process such colors are rather severely attacked and the use of processes involving strong oxidizing agents such as chlorates have, therefore, been definitely limited in their field of utility.

Some of the disadvantages of the chlorate acid vapor process are overcome by a procedure in which a milder oxidizing agent, such as a dichromate, is incorporated into the printing paste containing sulfuric esters of leuco vat dyestuffs, and aging effected with acid vapors, such as, for example, mixed acetic acid-formic acid vapors. It is with this dichromate process that the improvement of the present invention deals.

The dichromate-acid vapor process, while it does not attack sensitive dyes, is also subject to a number of drawbacks. The principal one is that certain sulfuric esters of leuco vat dyestuffs which are difficultly oxidizable do not fully develop during the acid vapor treatment within the usual aging periods of about 1–5 minutes, even when large excesses of the oxidizing agent are used. Also, drastic increases in the aging time, e. g. up to 20 minutes, do not bring about full development. A further drawback is that development of the incompletely developed color sometimes continues slowly during after-storage of the fabric, which results in a change of shade. As a result of the above drawbacks the dichromate-acid vapor process has been restricted to sulfuric esters of leuco vat dyes which are readily oxidizable, and has been considered unsuitable for a large field of difficultly oxidizable esters, especially those derived from indigos and thioindigos that contain negative substituents. As a result the dichromate-acid vapor process has not been usable with a certain class of sulfuric esters of leuco vat dyes, including some of the important vat colors.

According to the present invention it has been found that full development in a short time is obtained by the dichromate-acid vapor process with difficultly oxidizable sulfuric esters of leuco vat dyestuffs when there is added to the paste certain aromatic hydroxy sulfonic acids, preferably in form of their water-soluble salts. The sulfonic acids which may be considered as development accelerators or catalysts may be added either to the printing paste or to the dry ester salts used in preparing a printing formula. When properly used, fast prints are obtained of excellent strength and brilliance, the dyeing strength being increased in many cases from values as low as 10% to substantially the full color value.

The aromatic sulfonic acid compounds usable belong to a particular class, namely, monohydroxy sulfonic acids of the benzene and naphthalene series, and dihydroxy sulfonic acids of these series in which the hydroxyl groups are separated by an uneven number of nuclear carbon atoms. The result with these particular sulfonic acids is most surprising, because the dihydroxy sulfonic acids in which the hydroxyl groups are separated by an even number of carbon atoms exert precisely the opposite effect, that is to say, they are anti-oxidants, and in fact some of them have actually been used as such in various printing processes.

It should be emphasized that the process of the present invention is strictly limited to an improved dichromate-acid vapor printing process in which leuco vat dye ester salts are used which are difficultly oxidizable in this process. It should not be confused with processes in which development is effected by passing the printed goods through a liquid bath containing an oxidizing agent, such as nitrite or dichromate. In general, vat dye ester salts which are difficult to oxidize by this bath process are also difficult to oxidize by the dichromate-acid vapor process. There are, however, a few exceptions where a leuco vat dye ester salt is fairly readily oxidized by the bath process and is difficultly oxidizable by the dichromate-acid vapor process, requiring one of our catalysts for full development.

The amount of oxidation accelerator or dyeing assistant is not critical. Apparently, the compound does not take part strictly as a reactant, and a considerably smaller amount of the accelerator may be used than oxidizing agent. In general, an amount of accelerator which is somewhat less than the weight of the dyestuff ester gives best results. However, good results are obtained from quite a wide range of proportions. It is, of course, necessary to add sufficient accelerator to produce rapid oxidation, the minimum amount varying with different accelerators and with different dyes. Small traces of accelerators are, of course, not effective, as the reaction appears not to be a purely catalytic one in which minute quantities of accelerator are capable of carrying on the reaction of very large amounts of dyestuff and oxidizer.

It is an advantage of the present invention that the rate of development can be controlled by the use of varying amounts of the accelerator, and it is possible to obtain full development without using a large excess of oxidizing agent. These advantages are obtained without any corresponding defects in the quality of the prints. In fact, they are even more level and free from specks than normal.

Typical accelerators usable in the present invention are the following: phenol sulfonic acids, cresol sulfonic acids, guaiacol sulfonic acids, 1-naphthol-4-sulfonic acid, 1-naphthol-5-sulfonic acid, 2-naphthol-8-sulfonic acid, 2-naphthol-3,6-disulfonic acid; resorcinol sulfonic acids, 1,8-dihydroxynaphthalene-3,6-disulfonic acid. The sulfonic group does not need to substitute the nucleus but may substitute a side chain; as a matter of fact, 2-hydroxy-1-methyl-naphthalene omega sulfonic acid is one of the most efficient agents. The sulfonic acids are preferably used in the form of their water-soluble salts. Sodium salts, on account of their low cost, are preferred.

The following examples are illustrative of the invention. The process is not limited to the use with any particular fiber, but may be used for the development of the ester salts of leuco vat dyestuffs in connection with dyed, printed or padded fabrics or textile fibers.

Example 1

35.0 parts of the sodium salt of the disulfuric acid ester of leuco tetrabromoindigo (equivalent to 22.47 parts of tetrabromoindigo) are blended with 10.0 parts of 2-naphthol-1-methane omega sulfonic acid, sodium salt and 6.65 parts of sucrose to give a powder containing 43.5% real dye.

A printing paste is made from this blended powder, using the following ingredients:

3 parts color
6 parts urea
3 parts of a mixture of 4 parts acetamide, 4 parts of diethylene glycol, and 2 parts furfuryl alcohol
11 parts water
70 parts of a 15% gum paste in water
2 parts 25% ammonia
5 parts 25% sodium dichromate solution
3 parts 25% ammonium chloride solution The cloth is printed with this paste, dried and aged in hot aceticformic acid vapor. The prints are soaped and dried. With this blend, the full color value is obtained in 1–3 minutes. If the 2-naphthol-1-methane omega sulfonic acid is omitted from the blend, only 5–10% of the expected strength is produced.

Example 2

6 parts of the sodium salt of the disulfuric acid ester of leuco tetrabromoindigo (3.74 parts real dye) are blended with 2 parts 1-naphthol-5-sodium sulfonate (L salt) and 2.68 parts sucrose to give a powder containing 35% real dye. When a paste made from this blend as described in Example 1 is printed and aged on the cloth in the usual manner, substantially full color value is obtained in 3–5 minutes' aging. In the absence of 1-naphthol-5-sodium sulfonate, only a fraction (10% of the expected strength is produced).

Example 3

6 parts of the sodium salt of the disulfuric ester of leuco tetrabromoindigo (3.74 parts real dye) are blended with 2 parts 1-naphthol-4-sodium sulfonate (Nevile and Winther's salt) and 2.68 parts sucrose to give a powder containing 35% real dye. A paste made from this powder as described in Example 1 and printed and aged in the usual manner develops very quickly to give substantially full color value. In the absence of 1-naphthol-4-sodium sulfonate, only 5–10% of the expected strength is produced.

Example 4

6 parts of the sodium salt of the disulfuric ester of leuco tetrabromoindigo (3.8 parts real dye) are blended with 3 parts potassium guaiacol sulfonate and 1.8 parts sucrose to give a powder containing 35% real dye. Prints of full color value are obtained on very short aging when the cloth is printed and aged with the paste prepared from this powder as described in Example 1. In the absence of potassium guaiacol sulfonate, only 5–10% of the expected color value is obtained.

Example 5

10 parts of the sodium salt of the disulfuric acid ester of leuco 4,4',5,5'-dibenzthioindigo (5.16 parts real dye) are blended with 1.4 parts 2-naphthol-1-methane omega sulfonic acid to give a powder containing approximately 45% real dye. When a paste made from this blend is printed and aged on the cloth in the usual manner, substantially full color value is obtained in 3–5 minutes' aging. In the absence of 2-naphthol-1-methane omega sulfonic acid sodium salt, only about 10% of the color value is obtained under similar conditions of printing.

The leuco vat dye ester salt used in this example constitutes one of the few exceptions referred to in the introductory portion of the specification. This ester salt has been characterized in the literature as being fairly readily oxidizable in liquid development processes where the leuco ester salt is used primarily for dyeing rather than printing. In the dichromate-acid vapor process of developing prints this leuco ester salt is to be characterized as difficultly oxidizable since it will not develop to full color value in a reasonable time without the use of the accelerators of the present invention.

Example 6

4.1 parts of the sodium salt of the disulfuric acid ester of leuco 4,4'-dimethyl-6,6'-dichlorothioindigo (2.15 parts real dye) are blended with 0.6 part 2-naphthol-1-methane omega sodium sulfonate and 1.3 parts of sucrose to give a powder containing 35.5% real dye. When a paste made from this blend as described in Example 1 is printed and aged on cloth in the usual manner, essentially full color value is obtained in 3–5 minutes. In the absence of the 2-naphthol-1-methane omega sodium sulfonate, not more than 10–20% of the expected color value is produced.

We claim:

1. A process for printing difficultly oxidizable sulfuric ester salts of leuco vat dyestuffs of the indigoid type which comprises printing the ester salts with dichromates and an amount sufficient to obtain full development of the dye of an accelerator selected from the group consisting of sulfonic acids and water-soluble salts thereof, and developing the print with acid vapors, said sulfonic acids having the formula:

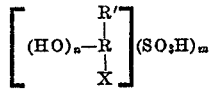

where R is an aromatic hydrocarbon radical selected from the group consisting of benzene and naphthalene radicals, R' is a radical selected from the group consisting of saturated lower aliphatic hydrocarbon radicals and hydrogen, X is a substituent selected from the group consisting of alkyl radicals, alkoxy radicals and hydrogen, $n$ is an integer less than three, the hydroxyl groups being separated by an uneven number of nuclear carbon atoms when $n$ equals two, and $m$ is an integer less than three.

2. A process according to claim 1 in which R is naphthyl.

3. A composition of matter comprising a difficultly oxidizable sulfuric ester salt of a leuco vat dyestuff of the indigoid type and a water-soluble salt of a sulfonic acid having the formula:

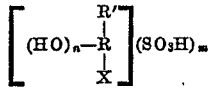

where R is an aromatic hydrocarbon radical selected from the group consisting of benzene and naphthalene radicals, R' is a radical selected from the group consisting of saturated lower aliphatic hydrocarbon radicals and hydrogen, X is a substituent selected from the group consisting of alkyl radicals, alkoxy radicals and hydrogen, $n$ is an integer less than three, the hydroxyl groups being separated by an uneven number of nuclear carbon atoms when $n$ equals two, and $m$ is an integer less than three.

4. The composition of claim 3 wherein R is naphthyl.

5. A process which comprises printing a disulfuric ester salt of leuco tetrabromoindigo, a dichromate and the sodium salt of 2-hydroxy-1-methyl naphthalene omega sulfonic acid and developing the color by subjecting the print to the action of acid vapors.

6. A composition of matter comprising a salt of the disulfuric ester salt of leuco tetrabromoindigo and the sodium salt of 2-hydroxy-1-methyl naphthalene omega sulfonic acid.

7. A process which comprises printing a disulfuric ester salt of leuco 4,5,4',5'-dibenzthioindigo, a dichromate and the sodium salt of 2-hydroxy-1-methyl naphthalene omega sulfonic acid and developing the color by subjecting the print to the action of acid vapors.

8. A composition of matter comprising a salt of the disulfuric ester salt of leuco 4,5,4',5'-dibenzthioindigo and the sodium salt of 2-hydroxy-1-methyl naphthalene omega sulfonic acid.

9. A process which comprises printing a disulfuric ester salt of leuco 4,4'-dimethyl-6,6'-dichlorothioindigo, a dichromate and the sodium salt of 2-hydroxy-1-methyl naphthalene omega sulfonic acid and developing the color by subjecting the print to the action of acid vapors.

10. A composition of matter comprising a salt of the disulfuric ester salt of leuco 4,4'-dimethyl-6,6'-dichlorothioindigo, and the sodium salt of 2-hydroxy-1-methyl naphthalene omega sulfonic acid.

WILLIAM B. HARDY.
ELIZABETH M. HARDY.

REFERENCES CITED

The following references are of record in the file of this patent:

UNITED STATES PATENTS

| Number | Name | Date |
| --- | --- | --- |
| 2,234,301 | Niederhausern | Mar. 11, 1941 |

FOREIGN PATENTS

| Number | Country | Date |
| --- | --- | --- |
| 398,571 | France | Mar. 26, 1909 |